United States Patent [19]

Shimano

[11] Patent Number: 4,523,492
[45] Date of Patent: Jun. 18, 1985

[54] PEDAL FOR A BICYCLE

[75] Inventor: Keizo Shimano, Sakai, Japan

[73] Assignee: Shimano Industrial Company Limited, Osaka, Japan

[21] Appl. No.: 574,945

[22] Filed: Jan. 30, 1984

Related U.S. Application Data

[63] Continuation of Ser. No. 333,170, Dec. 21, 1981, abandoned.

[30] Foreign Application Priority Data

Dec. 28, 1980 [JP] Japan .......................... 55-188819[U]

[51] Int. Cl.³ .............................................. G05G 1/14
[52] U.S. Cl. ................................................. 74/594.4
[58] Field of Search ................. 74/594.4, 594.5, 594.6, 74/563

[56] References Cited

U.S. PATENT DOCUMENTS

| 587,335 | 8/1897 | Shephard | 74/594.6 |
| 642,770 | 2/1900 | Whaley et al. | 74/594.6 |
| 649,127 | 5/1900 | Grotenhuis | 74/594.6 |
| 4,313,352 | 2/1982 | Okajima | 74/594.4 |
| 4,335,628 | 6/1982 | Shimano | 74/594.4 |

FOREIGN PATENT DOCUMENTS 427576 4/1935 United Kingdom .............. 74/594.6

Primary Examiner—Kenneth J. Dorner
Attorney, Agent, or Firm—Stevens, Davis, Miller & Mosher

[57] ABSTRACT

A pedal for a bicycle, which is provided at the upper surface of a pedal body having a pedal shaft and in the vicinity of the pedal shaft with a main foot bearing surface with which the metatarsi of a cyclist's foot at the phalange side are brought into contact, and at the rear side of the main foot bearing surface with an auxiliary foot bearing surface with which the metatarsi at the tarsus side are brought into contact.

7 Claims, 6 Drawing Figures

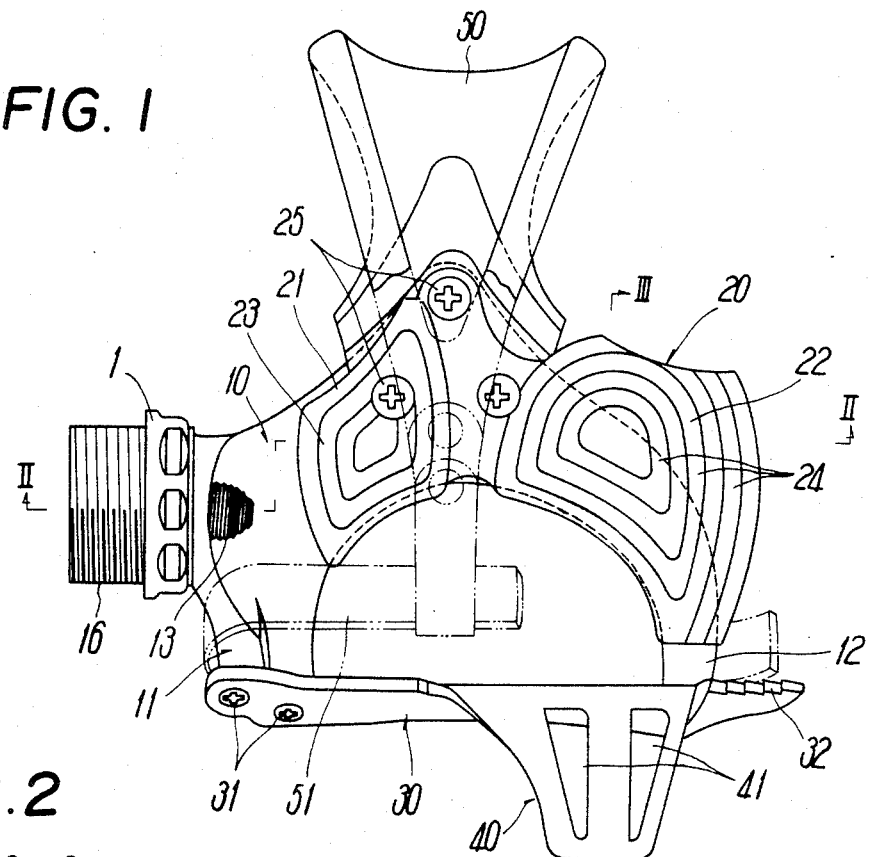
FIG. 1
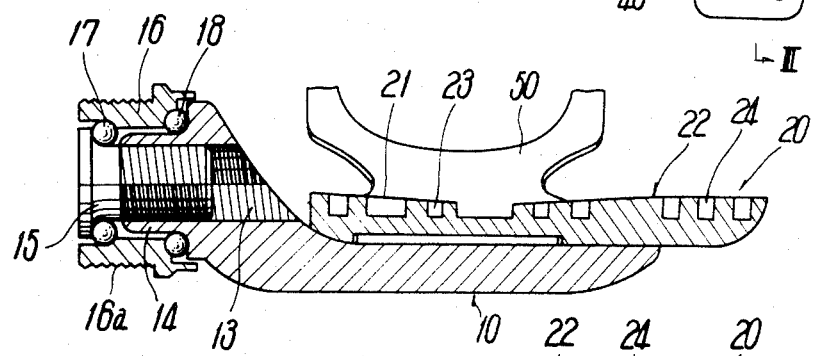
FIG. 2
FIG. 3
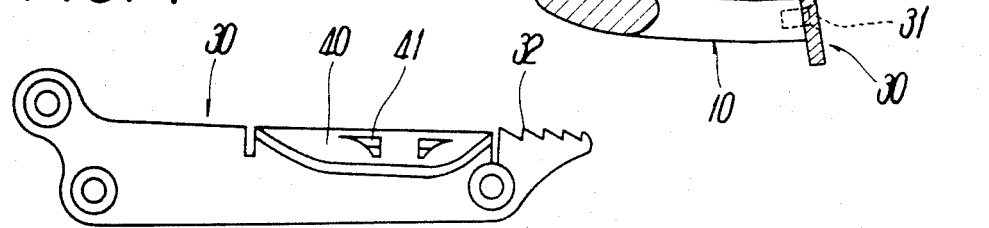
FIG. 4

PEDAL FOR A BICYCLE

This application is a continuation of application Ser. No. 333,170, filed Dec. 21, 1981, now abandoned.

FIELD OF THE INVENTION

This invention relates to a pedal for a bicycle, and more particularly to a pedal for a bicycle, which comprises a pedal body having a pedal shaft and which is supported rotatably to the utmost end of an crank arm at the bicycle, so that a cyclist treads the pedal body for cranking.

BACKGROUND OF THE INVENTION

Generally, the pedal body, as disclosed by the U.S. Pat. No. 2,542,548 and Swiss Pat. No. 279,819, has foot bearing portions at both sides of the axis of the pedal shaft and in parallel thereto.

The front and rear foot bearing portions at the pedal body are spaced at about an interval of a width sufficient to receive the metatarsi of a cyclist's foot only at the phalange side. Therefore, when a cyclist brings the head portions of his metatarsi into contact with the foot bearing portions, the metatarsi at the tarsus side tend to come off the foot bearing portions.

A bony framework at the human foot usually comprises 26 bones in combination, which are divided from an aspect of construction roughly into the tarsi, metatarsi, and phalanges. The tarsi comprise seven bones of the calcaneus, talus, cuboid, navicular, and first through third cuneiforms, in a tight combination. The metatarsi extend forwardly from the tarsi and comprise five first through fifth metatarsi corresponding in number to the toes and arranged laterally. The phalanges extend forwardly in continuation of the metatarsi and comprise 14 bones for the toes, in which a first phalange for the big toe comprises two bones, and other second to fifth metatarsi each comprise three bones for other toes.

The talus bears through the tibia a body weight of a person standing on the foot on the ground and shares it to the metatarsi through the navicular and cuboid and to the calcaneus.

The cyclist, when treading the pedal, transmits a treading force to the pedal body through the tarsi and metatarsi, but not through the calcaneus coming off from the pedal body.

From the aspect of the above human body framework, a cyclist transmits his treading force to the pedal body only through the heads of the metatarsi at the phalange side and smoothly moves his ankle joint to perform a proper pedalling operation. On the contrary, the arched structure by the metatarsi and tarsi bears a larger load, so that the cyclist is easily tired, resulting in that he cannot transmit a larger treading force tirelessly to the pedal body, especially when starting the bicycle or driving it on an upward slope.

As a countermeasure to the above, the conventional pedal body is enlarged in the interval between the front and rear foot bearing portions at both sides of the axis of the pedal shaft. In this instance, the head portions of the metatarsi and and the tarsi, are brought into contact always with both the foot bearing portions, so the treading force cannot be given only from the head portions of the metatarsi at the phalange side. Therefore, although the above problem of the larger treading force during a high load may be solved, another problem will be created in that an unsmooth motion of the ankle leads to an improper pedalling operation for driving the bicycle at high speed.

SUMMARY OF THE INVENTION

An object of the invention is to provide a pedal for a bicycle, which can transmit the treading force to the pedal body from the tarsi as well as the head portions of the metatarsi at the phalange side, so that a larger treading force is applied to the pedal body with less fatigue, especially under a larger load for driving the bicycle.

This invention is characterized in that a pedal body having a pedal shaft is provided at the upper surface and in the vicinity of the axis of the pedal shaft with a main foot bearing surface for contact with the metatarsi of the cyclist's foot at the phalange side, and at the rear side of the main foot bearing surface with an auxiliary foot bearing surface for contact with the metatarsi at the tarsus side, so that the pedalling operation can be performed in cooperation of the main foot bearing surface with the auxiliary foot bearing surface as well as only by the main foot bearing surface.

In other words, not only the head portions of the metatarsi solely can lightly transmit the treading force for high speed pedalling operation, but also the same in cooperation with the portions of the metatarsi at the tarsus side can transmit a larger treading force to the pedal body to permit driving the bicycle with less fatigue even under a greater treading load.

Other objects and features of the invention will be more apparent from the following detailed description of an embodiment taken in accordance with the accompanying drawings.

BRIEF DESCRIPTION OF THE DRAWINGS

FIG. 1 is a partially omitted plan view of an embodiment of the invention,

FIG. 2 is a partially omitted sectional view taken on the line II—II in FIG. 1,

FIG. 3 is a sectional view taken on the line III—III in FIG. 1,

FIG. 4 is a rear view of a rear side plate only, which is used in the FIG. 1 embodiment.

DETAILED DESCRIPTION OF THE INVENTION

Figure 5:
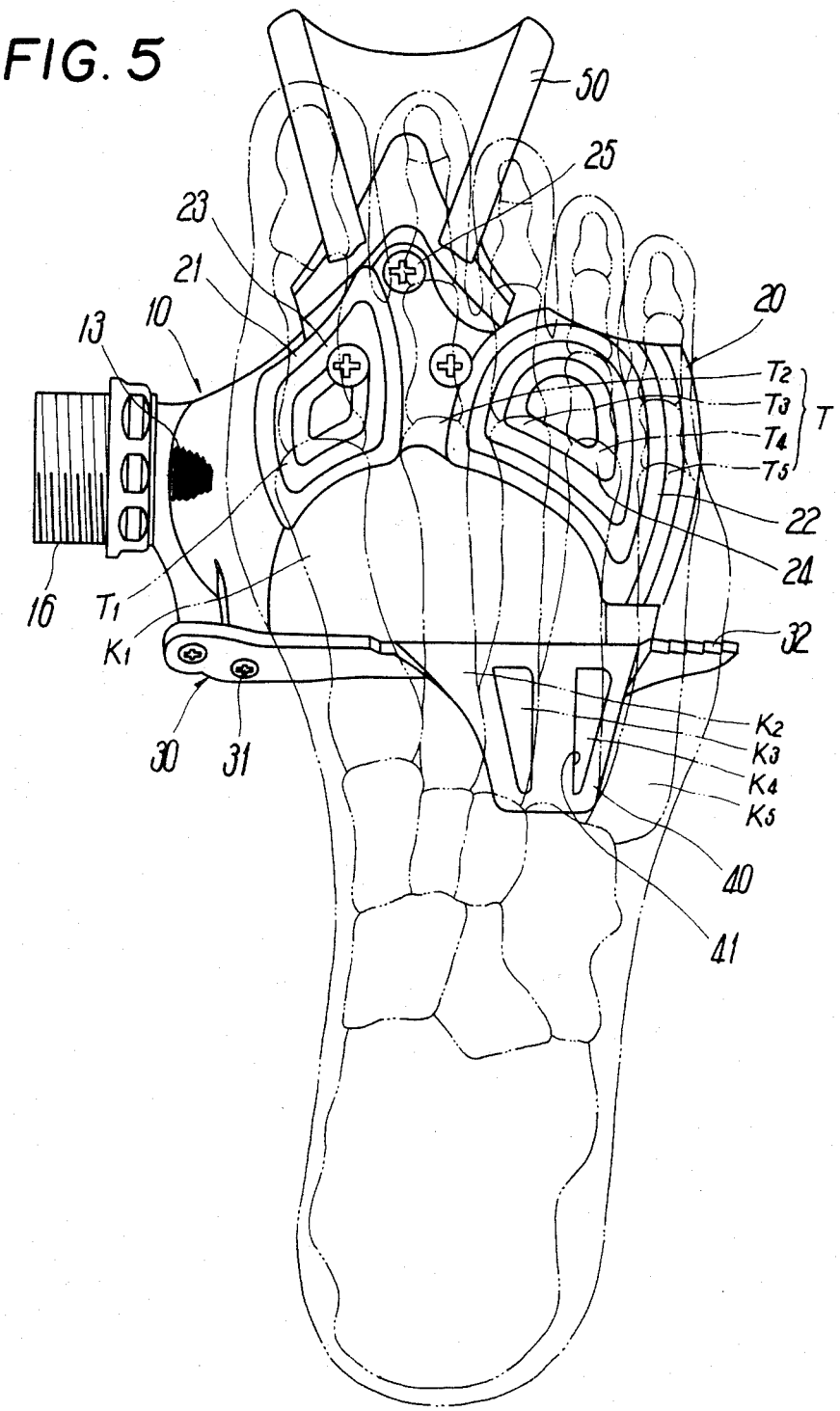
FIG. 5 is a plan view explanatory of a cyclist's foot in condition of being placed on the pedal shown in FIGS. 1 through 3.

Referring to FIG. 1, a right-hand pedal is shown, in which a pedal body 10 is formed of an aluminum alloy and in a block like shape by use of die casting, and a foot bearing member 20 and a rear side plate 30, which are separate from the pedal body 10, are formed of an aluminum alloy, plate-like shaped by die casting, and assembled with the pedal body 10.

The pedal body 10 projects frontward at a laterally intermediate portion thereof, has an inverted-V-like-shaped, and extends rearwardly at both lateral sides, and the rear side plate 30 is attached to the extensions 11 and 12 of pedal body 10 by use of fixing means 31, such as screws. Also, the pedal body 10 is provided at one lateral side (the left side in FIG. 1) with a tubular member 14 having a threaded inner periphery 13 as shown in FIG. 2, the tubular member 14 screwing with a pedal shaft 15.

In addition, in FIG. 2, reference numeral 16 designates a bearing cylinder. The bearing cylinder 16 is sleeved rotatably onto the pedal shaft 15 and tubular member 14 through pairs of balls 17 and 18, and has at the outer periphery a screw thread 16a screwable with the utmost end of a crank arn (not shown) at the bicycle, thereby supporting the pedal body 10 rotatably to the crank arm.

Furthermore, the foot bearing member 20 and rear side plate 30 constitute a main foot bearing surface of the invention, which surface, as shown, includes a front foot bearing surface formed of the foot bearing member 20 and a rear foot bearing surface formed of the rear side plate 30.

In detail, the foot bearing member 20 is fixed to the upper surface of pedal body 10 by the use of fixing means 25, such as screws, and has a first foot bearing surface 21 and a second foot bearing surface 22. The first foot bearing surface 21 bears the head portion $T_1$ of a first metatarsus $K_1$ at the cyclist's foot and the second surface 22 bears the head portions $T_3$ to $T_5$ of third to fifth metatarsi $K_3$ to $K_5$, so that, when the head portion $T_1$ is brought into contact with the first foot bearing surface 21, the head portions $T_3$ to $T_5$ are brought into contact with the second surface 22. In addition, the second foot bearing surface 22, as shown in FIG. 1, is formed in an area as large as contactable mainly with the head portions $T_3$ to $T_5$ of third to fifth metatarsi $K_3$ to $K_5$, but may alternatively be large enough to be contactable with the head portions $T_2$ to $T_5$ of second to fifth metatarsi $K_2$ to $K_5$, or only with the head portion $T_5$ of the fifth metatarsus $K_5$.

The first and second foot bearing surfaces 21 and 22 constitute the front foot bearing surface at the main foot bearing surface, and may be formed on the upper surface of the aforesaid foot bearing member 20, or provided directly onto the pedal body 10. Also, they are higher at the upper surfaces than the body 10 and have at the same a plurality of grooves 23 and 24 extending, for example, longitudinally and bilaterally, so that the edges of grooves 23 and 24 serve to prevent the cyclist's foot from skidding. In addition, the grooves 23 and 24, when loop-like-shaped, are more effective to prevent said skidding.

Furthermore, the first and second foot bearing surfaces 21 and 22 each have the greater part thereof disposed in front of and near the axis of pedal shaft 15, and the rest at the rear side of the same.

In the embodiment shown in FIG. 1, the rear side plate 30 forms at its upper end face a rear foot bearing surface 32 for the main foot bearing surface and also provides an auxiliary foot bearing surface 40 as an important element of the invention.

Namely, the rear side plate 30 is formed of a plate member smaller in width which bends at the upper end and extends rearwardly to form at the extension the auxiliary foot bearing surface 40.

The auxiliary foot bearing surface 40, disposed longitudinally of the pedal body 10, is made sufficiently long so as to be contactable with the metatarsi of the cyclist's foot at the tarsus N side, and is sufficiently laterally wide so as to be contactable mainly with the third and fourth metatarsi or the fourth and fifth metatarsi at the tarsus N side.

The width of auxiliary foot bearing surface 40 is not limited as just defined, but it may be wide enough to contact with the first through fifth metatarsi at the tarsus N side. However, the auxiliary surface 40 may be omitted at a side of the first and second metatarsi because they are of the arched structure with respect to the other metatarsi. Also, the through bores 41 provided at the auxiliary foot bearing surface 40 as shown in FIG. 1, are not indispensable. The auxiliary foot bearing surface 40 which is shown as integral with the rear side plate 30 may alternatively be integral with the pedal body 10, or separate from the rear side plate 30 and pedal body 10.

In the drawings, reference numeral 50 designates a toe clip, and 51 designates a toe strap. The toe clip 50 is fixedly sandwiched at one end between the laterally intermediate front portions of pedal body 10 and foot bearing member 20 by use of the fixing means 25 and is connected at the other end with an intermediate portion of toe strap 51, in a longitudinally movable manner at the root of toe clip 50.

Figure 6:
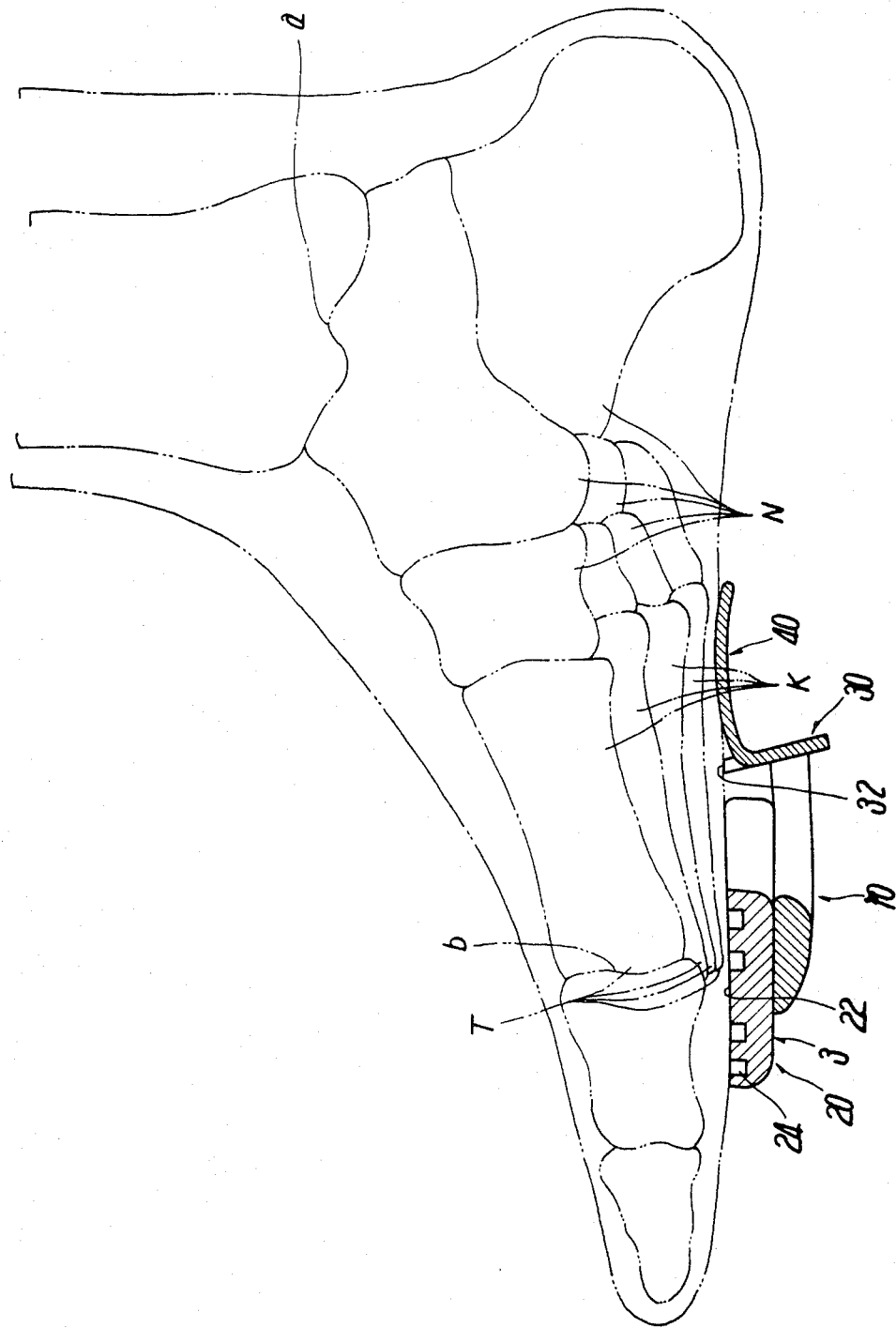
FIG. 6 is a sectional view explanatory of the same.

In the pedal of the invention as constructed as abovementioned, when the head portion $T_1$ of the first metatarsus $K_1$, as shown in FIGS. 5 and 6, is brought into contact with the first foot bearing surface 21, the head portions $T_3$ to $T_5$ of the third to fifth metatarsi $K_3$ to $K_5$ are brought into contact with the second foot bearing surface 22. In these conditions, the cyclist treads the pedal body 10 to drive the bicycle.

When driving the bicycle, for example, at high speed on the flat road, the cyclist performs the pedalling operation raising his heel from the auxiliary foot bearing surface 40, because a larger treading force is unnecessary. At this time, the metatarsi K and tarsi N between the ankle joint a and the joints b of phalanges U, as shown in FIG. 6, are arranged in a largely arched structure, so that the treading force is transmitted to the pedal body 10 only through the head portions $T_1$ and $T_3$ to $T_5$ of metatarsi $K_1$ and $K_3$ to $K_5$. Hence, the cyclist can perform the pedalling operation at high speed with a smooth motion of his ankle.

On the other hand, when starting the bicycle or driving it on an upward slope under a larger treading load, the cyclist can bring the metatarsi K at the tarsus side into contact with the auxiliary foot bearing surface 40 simultaneously with contacting of the head portions T of the metatarsi K with the first and second foot bearing surfaces 21 and 22, thereby transmitting a larger treading force to the pedal body 10 through the main foot bearing surface and auxiliary foot bearing surface 40 in cooperation with each other.

In this instance, the metatarsi K at both the phalange side and the tarsus side can apply the treading force to the pedal body 10, so that the aforesaid arched structure becomes smaller and is less loaded. Hence, the cyclist is less fatigued to that extent while transmitting a larger treading force reliably to the pedal body 10.

In addition, the rear foot bearing surface 32, when the cyclist performs no pedalling operation or treads the auxiliary foot bearing surface 40 as well as the main foot bearing surface, comes into contact with the rear portions of metatarsi K to keep the cyclist's foot in a stable condition, which is not so important for the pedalling operation.

As seen from the above, the pedal of the invention is provided at the rear side of the pedal body having the main foot bearing surface and in the vicinity of the pedal shaft with the auxiliary foot bearing surface in contact with the metatarsi at the tarsus side of the cyclist's foot treading the pedal, whereby the cyclist can perform the pedalling operation at high speed by treading the main foot bearing surface only and keeping in the arched structure the metatarsi and tarsi between the ankle joint and the joints of the phalanges. Also, the metatarsi at the tarsus side are brought into contact with the auxiliary foot bearing surface when a treading load is larger. Hence, the treading force can be applied to each foot bearing surface from the metatarsi at both the phalange side and the tarsus side, whereby the aforesaid arched structure of the foot bones is less loaded and the cyclist is less tired with transmitting even a larger treading force to the pedal body.

While, an embodiment of the invention has been shown and described, the invention is not limited to the specific construction thereof, which is merely exemplary in the specification rather than defined.

What is claimed is:

1. A pedal for a bicycle for use with a cyclist's foot having bones therein known as metatarsi, phalanges, and tarsus said pedal comprising a pedal body having a pedal shaft, said pedal body having upper and lower surfaces, and having at said upper surface a main foot bearing surface said main foot bearing surface including upwardly projecting first and second foot bearing portions separated by a gap from one another and located to contact with all head portions of metatarsi of a cyclist's foot, each of said first and second foot bearing portions being located in the vicinity of an axis of said pedal shaft, said first and second foot bearing portions being located axially along said pedal shaft with said first foot bearing portion being axially closest to a base portion of said pedal shaft and said second foot bearing portion located axially outwardly of said pedal shaft relative to said first foot bearing portion, said second foot bearing portion extending rearwardly of said pedal body with respect to said first foot bearing portion, and at a rear side of said main foot bearing surface, an auxiliary foot bearing surface located to be contactable with only third through fifth metatarsi of a cyclist's foot at a side thereof of the tarsus when the head portion of all metatarsi are contacted by said main foot bearing surface.

2. A pedal for a bicycle according to claim 1, wherein said main foot bearing surface further comprises a rear foot bearing surface located to contact with rear portions of said head portions of the metatarsi when the head portions of the metatarsi are in contact with said first and second foot bearing portions.

3. A pedal for a bicycle according to claim 2, wherein said pedal body comprises a member separate therefrom and includes a rear side plate fixed to a rear portion of said pedal body, said rear foot bearing surface being formed at an upper end face of said rear side plate.

4. A pedal for a bicycle according to claim 3, wherein said rear side plate bends at an upper end thereof to form an extension which extends rearwardly, said auxiliary foot bearing surface being formed at said extension.

5. A pedal for a bicycle according to claim 1 wherein each of said first and second foot bearing portions has a greater portion thereof displaced in front of said axis and the remainder thereof displaced rearwardly of said axis.

6. A pedal for a bicycle as in claim 1 wherein said auxiliary foot bearing surface has a width in a direction along said axis which is less than a width of said main foot bearing surface in the same direction.

7. A pedal for a bicycle as in claim 2 wherein said rear foot bearing surface is spaced from said main foot bearing surface and extends outwardly of said pedal body with respect to said second foot bearing portion.

* * * * *